(12) United States Patent
Gardner

(10) Patent No.: US 6,612,523 B2
(45) Date of Patent: Sep. 2, 2003

(54) AIRCRAFT STRUCTURES HAVING IMPROVED THROUGH-THICKNESS THERMAL CONDUCTIVITY

(75) Inventor: Slade H. Gardner, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/028,340

(22) Filed: Dec. 21, 2001

(65) Prior Publication Data

US 2003/0116678 A1 Jun. 26, 2003

(51) Int. Cl.$^7$ ................................................. B64C 7/00
(52) U.S. Cl. ............................... 244/117 A; 244/117 R; 165/42
(58) Field of Search .............................. 244/119, 117 A, 244/129.1, 117 R, 158 A, 163; 165/169, 170, 42

(56) References Cited

U.S. PATENT DOCUMENTS

| | | | |
|---|---|---|---|
| 5,542,471 A | | 8/1996 | Dickinson .................... 165/170 |
| 5,566,752 A | * | 10/1996 | Arnold et al. ............... 165/185 |
| 5,935,698 A | * | 8/1999 | Pannell ....................... 428/223 |
| 5,972,524 A | * | 10/1999 | Childress .................... 428/615 |
| 6,205,803 B1 | * | 3/2001 | Scaringe ..................... 62/259.2 |

OTHER PUBLICATIONS

Webpages for Aztex, Inc., Products and Services, "What Does Aztex Offer", pp. 1–2 at http://www.aztex–z–fiber.com/product.html.
Webpages for Aztex, Inc., Z–Fiber Preforms, "Through–Thickness Reinforcement", p. 1–2 at http://www.aztex–z–fiber.com/products/zfiber1.html.

* cited by examiner

Primary Examiner—Peter M Poon
Assistant Examiner—Timothy D. Collins
(74) Attorney, Agent, or Firm—Bracewell & Patterson, L.L.P.

(57) ABSTRACT

An apparatus is provided for transferring heat through the thickness of aircraft structure formed from composite laminates. Z-pins having a high thermal conductivity are inserted through the composite laminate and placed in thermal communications with a heat source at the end of each z-pin on one side of the structure. The ends of the z-pins on the opposite side of the structure as the heat source are in thermal communication with a heat sink. Each of the heat source and heat sink may be a fluid, which carries heat to or away from the z-pins by convective currents, or a component that is mechanically connected to the z-pins, which conduct heat from or to the component.

18 Claims, 2 Drawing Sheets

AIRCRAFT STRUCTURES HAVING IMPROVED THROUGH-THICKNESS THERMAL CONDUCTIVITY

BACKGROUND OF THE INVENTION

1. Field of the Invention

This invention relates generally to using z-pins in composite laminates and relates specifically to using z-pins to conduct heat through the thickness of composite laminates.

2. Description of the Prior Art

Z-pinning is used to reinforce composite joints, wherein carbon fiber composite pins are inserted through a composite laminate. An instrument uses ultrasonic energy and pressure to force the z-pins through the laminate. Z-pins available for reinforcing structural joints are typically made with standard modulus T-300 carbon fiber. However, this carbon fiber has fairly low thermal conductivity.

There are many systems on an advanced fighter aircraft which have thermal management issues. Typically a heat exchanger is used to cool electronic weapon systems, but heat exchangers can be large, complicated pieces of equipment which are difficult to install because of wiring and plumbing concerns. Prior art methods of disposing of excess heat include, for example, transferring heat into fuel in a wing structure. Though effective, these heat exchanger units are also expensive, take up valuable space in an aircraft, and require maintenance.

Material scientists are exploring new materials capable of passive thermal management. This special class of materials improves the efficiency of current heat exchangers, but can also be designed to direct heat to a desired location. Many of these new materials have a combination of deficits, such as low stiffness, poor toughness, very high cost and difficulties in manufacturing airframe components.

In U.S. Pat. No. 5,542,471, Dickinson describes a "Heat Transfer Element Having Thermally Conductive Fibers," which is a solid structure capable of transferring heat. This patent describes a composite structure comprising fiber bundles oriented to conduct heat through the thickness of the structure, the entire structure behaving as a heat exchanger. However, the Dickinson structures must be used when creating parts in order to allow the heat transfer, but these structures may not provide the required characteristics for particular components or applications.

Therefore, there is a need for a modification of typical structural composites to allow for greater heat transfer through the thickness of the composites.

SUMMARY OF THE INVENTION

This invention disclosure describes a composite structure which increases the thermal conductivity through the thickness. The invention would also allow current structural composites to be modified to behave as a heat path. For example, the composite skin of an air inlet could be readily modified to also behave as a heat exchanger, allowing heat to be dumped into air entering the aircraft engine. This design might create the option of altering the infrared signature of the aircraft by preferentially moving heat to a desired location for disposal.

An apparatus is provided for transferring heat through the thickness of aircraft structure formed from composite laminates. Z-pins having a high thermal conductivity are inserted through the composite laminate and placed in thermal communications with a heat source at the end of each z-pin on one side of the structure. The ends of the z-pins on the opposite side of the structure as the heat source are in thermal communication with a heat sink. Each of the heat source and heat sink may be a fluid, which carries heat to or away from the z-pins by convective currents, or a component that is mechanically connected to the z-pins, which conduct heat from or to the component.

BRIEF DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

DETAILED DESCRIPTION OF THE INVENTION

Figure 1:
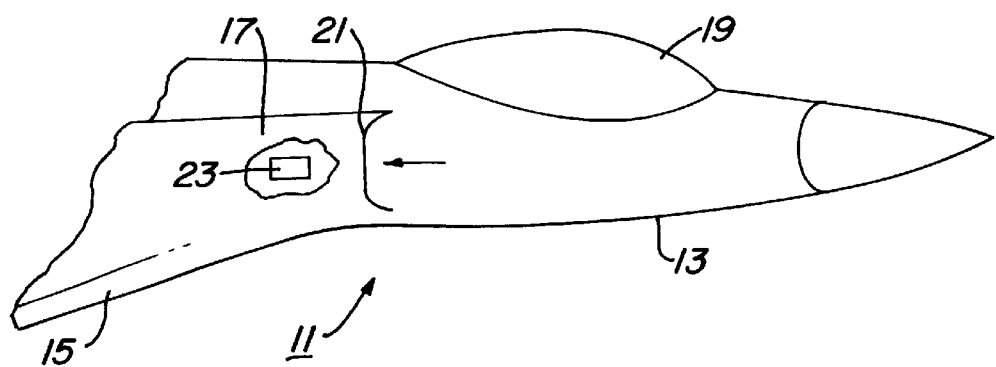
FIG. 1 is a perspective view of the forward portion of an aircraft constructed in accordance with the present invention.

FIGS. 1 and 3 through 5 illustrate the present invention. Referring to FIG. 1, an aircraft 11 has a fuselage 13 and wings 15 extending from fuselage 13. Fuselage 13 and wings 15 are covered by a skin 17, which may be formed of composite laminates or other rigid materials, such as metal. If aircraft 11 is manned, a pilot will be located within cockpit 19. Air intake 21 is a C-shaped channel mounted to the exterior of fuselage 13 for directing air to an engine (not shown) located in aircraft 11. Composite laminate panel 23 may be a separate and removable component, as shown, or may be an integral portion of skin 17. Panel 23 is shown as rectangular and slightly curved, though panel 23 can also be other shapes and curvature. Panel 23 is typically has a thickness of ⅛" to 1" Though panel 23 is shown located on fuselage 13 within intake 21, it may be located in other areas, such as on a rear, exterior portion of fuselage 13 having low air-frictional-heating characteristics.

Figure 2:
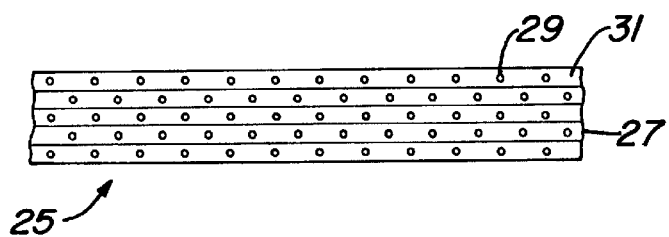
FIG. 2 is a schematic, cross-sectional view of a prior-art, composite laminate panel.

FIG. 2 shows a schematic cross-section of a typical, prior-art, composite laminate structure 25. Structure 25 is formed from several layers 27 of composite fabric, which may be unidirectional tape, braided preforms or woven fabrics preferably formed of carbon fibers 29, and an organic resin matrix 31. When formed from layers 27, layers 27 are applied in a stack to form laminate structure 25.

Carbon fibers are produced from two precursors: pitch and polyacrylonitrile (PAN). Pitch-based carbon fibers are made using petroleum or synthetic chemical pitch. These fibers typically have very good stiffness, but typically are more brittle and have lower strength. Pitch-based fibers have high thermal conductivity. PAN-based carbon fibers, however, typically have low thermal conductivity, but they have high mechanical strength and are often used for structural composites. Also, pitch-based carbon fibers don't bond well to organic matrix polymers, so translation of strength is poor for those composites. Pitch-based fibers are used in stiffness-critical structural applications where strength and durability are not as important, such as components for orbital satellites.

Figure 3:
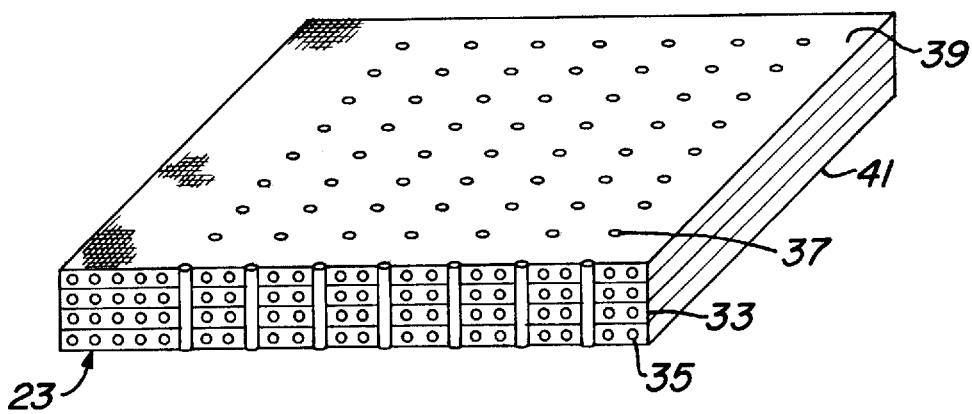
FIG. 3 is a perspective view of a composite laminate panel constructed in accordance with the present invention and having z-pins inserted through the thickness of the panel.

FIG. 3 is a perspective view of a portion of panel 23. Panel 23 is constructed in the same manner as structure 25 (FIG. 2), with layers 33 of fabric being stacked to form the thickness of panel 23. As described above, the fabric may be unidirectional tape, braided preforms or woven fabrics woven from carbon fibers 35, which are preferably PAN-based, fibers 35 being encased in a thermoplastic or semi-cured thermoset resin matrix.

Figure 4:
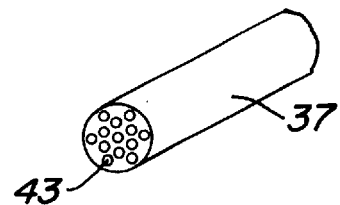
FIG. 4 is a schematic, perspective view of a z-pin constructed in accordance with the present invention.

Z-pins 37 are driven into panel 23, extending between outer surface 39 and inner surface 41. Z-pins 37 are typically about ½ mm to 1 mm in diameter and are preferably formed from pitch-based carbon fibers to provide for higher thermal conductivity than the PAN-based fibers of panel 23. FIG. 4 is a schematic representation of z-pins 37, a plurality of individual carbon fibers 43 forming each pin 37. Fibers 43 within z-pins 37 are oriented to extend from one end of z-pins 37 to the opposite end, providing a path for thermal energy to be transported through z-pins 37. Z-pins 37 are inserted to be generally perpendicular to layers 33.

Typically, as described above, a tool with an ultrasonic head is used to insert z-pins 37 into panel 23 before or after panel 23 is cured, the ultrasonic head providing energy to heat and soften the resin matrix during insertion. As z-pins 37 are inserted, fiber bundles within the layers of fabric forming panel 23 are moved aside, allowing z-pins 37 to penetrate panel 23. Z-pins 37 are shown inserted in a regular, repeating arrangement, though z-pins 37 may be arranged in any form appropriate to the specific application.

The preferred pitch-based carbon fibers is available from BP Amoco Performance Products, of Atlanta, Ga., under the trademark K-1100. K-1100 fibers have an axial thermal conductivity of 1000 W/m·K, more than five times the thermal conductivity of aluminum. PAN-based carbon fibers, by comparison, have a thermal conductivity along the fiber axis in the range of 8 to 20 W/m·K. K-1100 fibers also have good mechanical properties, having a tensile stiffness of 140 Msi and a tensile strength of 450 ksi. K-1100 fibers are compatible with current carbon-fiber composite structures with respect to thermal expansion issues. Furthermore, K-1100 fibers can be impregnated with any desired resin system, making it chemically compatible for bonding adhesion with a structural composite system.

The K-1100 fibers exhibit thermal conductivity that is directional along the longitudinal direction of the fiber, and the fibers radiate very little heat in the radial direction. Even if two fibers within a fiber bundle are touching each other along the length of the bundle, radial heat transfer from one fiber to the other is only on the order of about 5% of the total heat within the fiber. About 95% of the heat passes longitudinally through the fiber to the end of the fiber.

During use of panel 23, a heat source is in thermal communication with the ends of z-pins 37 on one side of panel 23. The thermal energy is transferred from the heat source, through z-pins 37, and to the opposite ends of z-pins 37. The opposite ends of z-pins 37 are in thermal communication with a heat sink that carries heat away from z-pins 37. The ends of z-pins 37 may be mechanically connected to the heat source or heat sink, or the ends of z-pins 37 may be exposed to air or fluid that acts as the heat source or heat sink.

Figure 5:
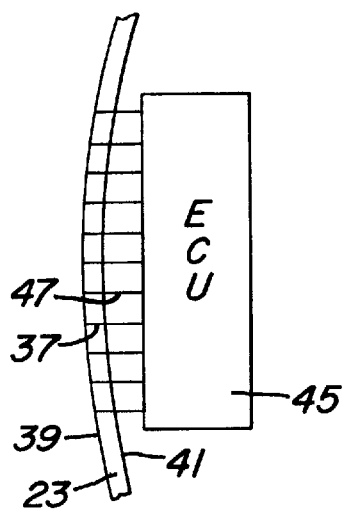
FIG. 5 is a schematic, cross-sectional view of an aircraft skin panel and ECU constructed in accordance with the present invention.

FIG. 5 shows an example application of the invention. Aircraft 11 may carry an environment-control unit (ECU) 45 for maintaining within desired values the temperature and other environmental characteristics within the aircraft. ECU 45 is connected via connectors 47 to z-pins 37 in panel 23. Connectors 47 are constructed to conduct heat down their length and maybe separate components formed from the same materials as z-pins 37, or they may be extensions of z-pins 37.

As ECU 45 generates heat and/or removes heat from within aircraft 11, the heat must be discarded. The heat is conducted through connectors 47 and into the ends of z-pins 37 at inner surface 41. Z-pins 37 then conduct the heat through their length to their opposite ends, located at outer surface 39 of panel 23 and in thermal communication with air passing over outer surface 39 as aircraft 11 moves through the air. Referring again to FIG. 1, heat can be transferred to air passing over skin 17 and panel 23 in air intake 21, the heat being discarded into t he engine (not shown). ECU 45 is considered a heat source, as it supplies heat to z-pins 37. In this example, the ambient air outside of panel 23 serves as a heat sink to receive the heat.

There are many advantages to using the present invention. Z-pins can be inserted through many existing composite structures, especially thermoplastic materials, or can be inserted during manufacturing. The reinforcement that z-pins provide can also be expected to improve the interlaminar shear strength of the composite structure in which they are used. Another advantage is that positioning z-pins so that they release heat in selected locations allows for greater control over the infrared signature that the aircraft emits. For example, the exposed portions of the z-pins can be located within an air inlet for an engine, the heat can be placed into the engine to locate released heat in one location, i.e., at the engine outlet. A further advantage is that the small radial leakage of heat from the z-pins ensures that large amounts of heat can be transferred though the z-pins without damage to the surrounding structure. An additional advantage is that high thermal conductivity can be achieved through the thickness of the structure by using low-strength materials, whereas the materials used in directions of loading are high-strength materials.

While the invention has been shown in only some of its forms, it is not thus limited but is susceptible to various changes and modifications without departing from the spirit thereof.

I claim:

1. An aircraft, comprising:
    an aircraft structure;
    a skin over the aircraft structure, the skin being a composite laminate formed from layers of fabric and having a first side and a second side opposite the first side;
    a heat source within the aircraft structure on the first side of the skin, the second side of the skin adapted to be exposed to a heat sink; and
    a plurality of pins, each of the pins being formed of a plurality of pitch-based carbon fibers, the pins extending through the skin from the first side to the second side and generally perpendicular to the layers of fabric, each having first and second ends, each first end being in thermal communication with the heat source, each second end adapted to be in thermal communication with the heat sink, the pins being spaced apart from and parallel to each other within the skin.

2. The aircraft of claim 1, wherein:
    the fibers of the pins are oriented to extend from the first end to the second end of the pins.

3. The aircraft of claim 1, wherein:
    the pins are distributed throughout a selected area of the skin.

4. The aircraft of claim 1, wherein:
    the fibers of the pins are oriented to extend from the first end to the second end of the pins; and
    the layers of the skin are formed from PAN-based carbon fibers.

5. The aircraft of claim 1, wherein:
    the heat source is an environment-control unit.

6. The aircraft of claim 1, wherein:
    the skin is a removable panel.

7. The aircraft of claim 1, wherein:
the second ends of the pins are substantially flush with an exterior surface of the skin and adapted to be exposed to ambient air, which serves as the heat sink.

8. An aircraft, comprising:
an aircraft structure;
a skin over the aircraft structure, the skin being a composite laminate formed from layers of fabric and having a first side and a second side opposite the first side;
a heat source within the aircraft structure on the first side of the skin, the second side of the skin adapted to be exposed to a heat sink;
a plurality of pins formed of pitch-based carbon fibers, the pins extending through the skin from the first side to the second side and generally perpendicular to the layers of fabric, each pin having first and second ends, each first end being in thermal communication with the heat source, each second end adapted to be in thermal communication with the heat sink;
an engine air intake formed on the exterior of the aircraft and located near the second ends of the pins; and wherein
the second ends of the pins are located upstream of the air intake, at least a portion of ambient air flowing over the second ends entering the air intake, the ambient air serving as the heat sink.

9. An aircraft, comprising:
a fuselage;
a heat source within the fuselage;
a skin over the fuselage, the skin being formed from a plurality of layers of fabric bonded together to create a composite structure, the layers of fabric having woven PAN-based carbon fibers therein;
a plurality of carbon fiber pins, each of the pins being formed of a plurality of pitch-based carbon fibers, the pins being parallel to each other, spaced apart from each other in a pattern distributed over a selected area of the skin, and extending through the skin generally perpendicular to the layers; and wherein
an inner side of the skin is in contact with the heat source and an opposite outer side of the skin is adapted to be in contact with ambient air flowing over the skin for transferring heat from the heat source to the ambient air through the pins, the pins having ends that are substantially flush with the outer side of the skin for exposure to the ambient air.

10. The aircraft of claim 9, wherein:
the fibers of the each of the pins are oriented to extend from the inner side of the skin to the outer side of the skin.

11. The aircraft of claim 9, wherein:
the heat source is an environment-control unit.

12. The aircraft of claim 9, wherein:
the skin is a removable panel.

13. An aircraft, comprising:
a fuselage;
a heat source within the fuselage;
a skin over the fuselage, the skin being formed from a plurality of layers of fabric bonded together to create a composite structure, the layers of fabric having woven PAN-based carbon fibers;
a plurality of carbon fiber pins formed of pitch-based carbon fibers and extending through the skin generally perpendicular to the layers; and wherein
a first side of the skin is in contact with the heat source and an opposite second side of the skin is adapted to be in contact with a heat sink for transferring heat from the heat source to the heat sink through the pins;
an engine air intake formed on the exterior of the fuselage and located near the pins; and wherein
the pins are located upstream of the air intake, at least a portion of air flowing over the second side of the skin entering the air intake and serving as the heat sink.

14. An aircraft, comprising:
a fuselage having a composite structure formed from a plurality of layers of fabric bonded together, the layers of fabric having woven PAN-based carbon fibers;
a heat source within the fuselage;
a plurality of z-pins, each of the z-pins being formed of a plurality of pitch-based carbon fibers joined together to form one of the z-pins and extending through the composite structure generally perpendicular to the layers, the z-pins being spaced apart from each other in a pattern that covers a selected area of the composite structure; and wherein
a first side of the composite structure is in contact with the heat source and an opposite second side of the composite structure is adapted to be in contact with a heat sink for transferring heat from the heat source to the heat sink through the z-pins.

15. The aircraft of claim 14, wherein:
the fibers of the z-pins are oriented to extend from the first side of the composite structure to the second side of the composite structure.

16. The aircraft of claim 14, wherein:
the composite structure is a portion of a skin of the fuselage; and
ambient air flowing over the second side of the composite structure serves as the heat sink, the z-pins having ends that are flush with the second side of the composite structure for exposure to the ambient air.

17. The aircraft of claim 16, wherein:
the composite structure is a removable panel.

18. An aircraft, comprising:
a fuselage having a composite structure formed from a plurality of layers of fabric bonded together, the layers of fabric having woven PAN-based carbon fibers;
a heat source within the fuselage;
a plurality of carbon fiber pins formed of pitch-based carbon fibers and extending through the composite structure generally perpendicular to the layers; and wherein
a first side of the composite structure is in contact with the heat source and an opposite second side of the composite structure is adapted to be in contact with a heat sink for transferring heat from the heat source to the heat sink through the pins; wherein:
the composite structure is a portion of a skin of the fuselage;
ambient air flowing over the second side of the composite structure serves as the heat sink; and wherein the aircraft further comprises:
an engine air intake formed on the exterior of the fuselage and located near the pins; and wherein
the pins are located upstream of the air intake, at least a portion of the air flowing over the second side of the composite structure entering the air intake.

* * * * *